(12) United States Patent
Umanesan

(10) Patent No.: US 11,722,558 B2
(45) Date of Patent: Aug. 8, 2023

(54) SERVER-SIDE RESOURCE MONITORING IN A DISTRIBUTED DATA STORAGE ENVIRONMENT

(71) Applicant: Seagate Technology LLC, Fremont, CA (US)

(72) Inventor: Ganesan Umanesan, Guildford (GB)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/249,174

(22) Filed: Feb. 23, 2021

(65) Prior Publication Data
US 2022/0272151 A1 Aug. 25, 2022

(51) Int. Cl.
| | |
|---|---|
| *G06F 15/173* | (2006.01) |
| *H04L 67/1012* | (2022.01) |
| *H04L 67/101* | (2022.01) |
| *H04L 47/70* | (2022.01) |
| *H04L 47/783* | (2022.01) |

(52) U.S. Cl.
CPC ........ *H04L 67/1012* (2013.01); *H04L 47/783* (2013.01); *H04L 47/827* (2013.01); *H04L 47/828* (2013.01); *H04L 67/101* (2013.01)

(58) Field of Classification Search
CPC . H04L 67/1012; H04L 67/101; H04L 47/783; H04L 47/828; H04L 47/827
USPC ........................ 709/226, 227, 228, 232, 233; 370/395.21, 229, 235, 400
See application file for complete search history.

(56) References Cited

U.S. PATENT DOCUMENTS

| | | | | |
|---|---|---|---|---|
| 6,295,608 B1* | 9/2001 | Parkes | .................. | G06F 8/4441 707/999.203 |
| 7,721,331 B1* | 5/2010 | Rowe | ...................... | G06F 21/56 717/176 |
| 7,809,689 B2* | 10/2010 | Bangel | .................. | G06F 16/273 707/654 |
| 8,024,712 B1* | 9/2011 | Korolev | .............. | G06F 11/3495 717/127 |
| 8,233,487 B2* | 7/2012 | Kusama | .............. | H04J 14/0249 370/395.21 |
| 8,656,501 B2* | 2/2014 | Gnahm | .................. | G06F 21/14 717/100 |
| 8,745,214 B2 | 6/2014 | Inamdar | | |

(Continued)

*Primary Examiner* — Thuong Nguyen
(74) *Attorney, Agent, or Firm* — Hall Estill Law Firm; Randall K. McCarthy

(57) ABSTRACT

Apparatus and method for performing real-time monitoring of server-side resources required to satisfy a client-side request in a distributed data storage environment, such as in a cloud computing or HPC (high performance computing) network. A client device is configured to issue a service request to carry out a service application associated with one or more server nodes. A request scheduler forwards the service request from the client device to a selected server node associated with the service request. A service log accumulates entries associated with data transfer operations carried out by the server node responsive to the service request over each of a succession of time periods. A service monitor accumulates, for each of the succession of time periods, information associated with the data transfer operations. A monitor tool aggregates the cumulative information to provide an indication of server-side resources utilized to satisfy the service request.

20 Claims, 8 Drawing Sheets

(56) References Cited

U.S. PATENT DOCUMENTS

| | | |
|---|---|---|
| 8,909,764 B2 | 12/2014 | Umanesan |
| 9,130,969 B2 | 9/2015 | Umanesan |
| 9,391,857 B2 | 7/2016 | Umanesan |
| 9,521,089 B2 | 12/2016 | Hu |
| 2004/0153997 A1* | 8/2004 | Anderson ........... G06F 11/3495 |
| | | 714/E11.2 |
| 2004/0260746 A1* | 12/2004 | Brown ................. G06F 9/5011 |
| | | 709/200 |
| 2006/0265382 A1* | 11/2006 | Armanino ............... G06F 16/10 |
| 2007/0274227 A1* | 11/2007 | Rauscher ................ H04L 43/50 |
| | | 370/252 |
| 2010/0017506 A1* | 1/2010 | Fadell .................. H04M 15/60 |
| | | 709/224 |
| 2010/0235592 A1* | 9/2010 | Kaneda ................ G06F 3/0607 |
| | | 711/E12.001 |
| 2011/0107307 A1* | 5/2011 | Liu ...................... G06F 11/3664 |
| | | 717/130 |
| 2013/0111034 A1* | 5/2013 | Upadhya ............ H04L 67/1097 |
| | | 709/226 |
| 2015/0143246 A1* | 5/2015 | Wang ....................... G06F 3/048 |
| | | 715/738 |
| 2015/0149622 A1 | 5/2015 | Umanesan |
| 2015/0154103 A1* | 6/2015 | Lee ..................... G06F 11/3409 |
| | | 717/129 |
| 2015/0160815 A1* | 6/2015 | Bragstad ................ H04L 67/75 |
| | | 715/734 |
| 2015/0229570 A1* | 8/2015 | Nishihara ........... G06F 13/4045 |
| | | 709/203 |
| 2015/0261971 A1* | 9/2015 | McFerrin ........... G06F 21/6218 |
| | | 707/781 |
| 2016/0139806 A1 | 5/2016 | Sanzone |
| 2016/0269536 A1* | 9/2016 | Hunnighan ........... H04W 4/029 |
| 2016/0344751 A1* | 11/2016 | Leach ................... H04L 67/535 |
| 2017/0034019 A1* | 2/2017 | Nataraj .............. G06F 11/3072 |
| 2017/0132702 A1* | 5/2017 | Bland ..................... G06Q 40/04 |
| 2019/0281489 A1* | 9/2019 | Hong ................... H04L 5/0064 |
| 2020/0012568 A1* | 1/2020 | Vig ..................... G06F 11/1451 |
| 2020/0019629 A1* | 1/2020 | Shilane ............... G06F 16/2329 |
| 2020/0065199 A1* | 2/2020 | Xing ................... G06F 11/3006 |
| 2020/0220782 A1* | 7/2020 | Parangattil .............. H04L 41/12 |
| 2020/0293373 A1* | 9/2020 | Amemiya ............. G06F 3/0646 |
| 2020/0406147 A1* | 12/2020 | Gauffin ..................... A63F 13/35 |
| 2021/0049596 A1* | 2/2021 | Guo ....................... G06F 16/245 |
| 2022/0113938 A1* | 4/2022 | Jha ......................... G06F 11/076 |

* cited by examiner

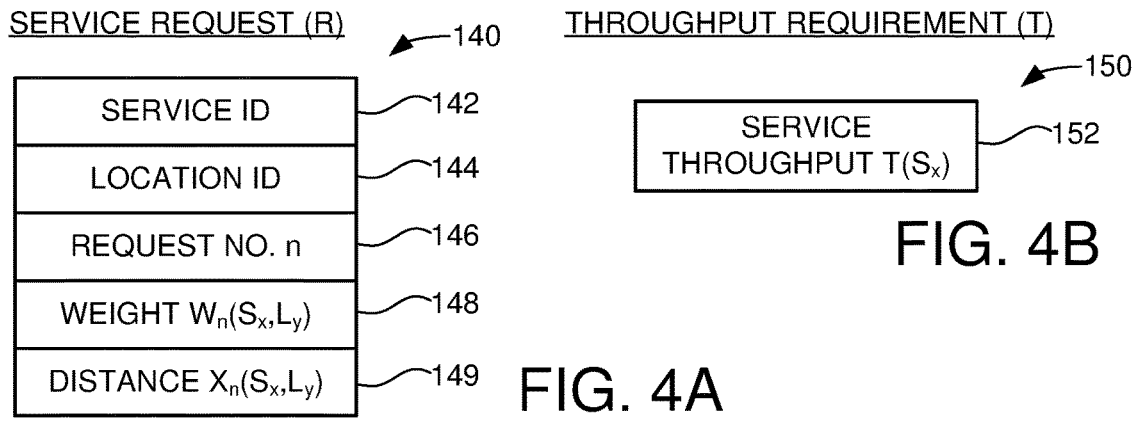
FIG. 4A
FIG. 4B
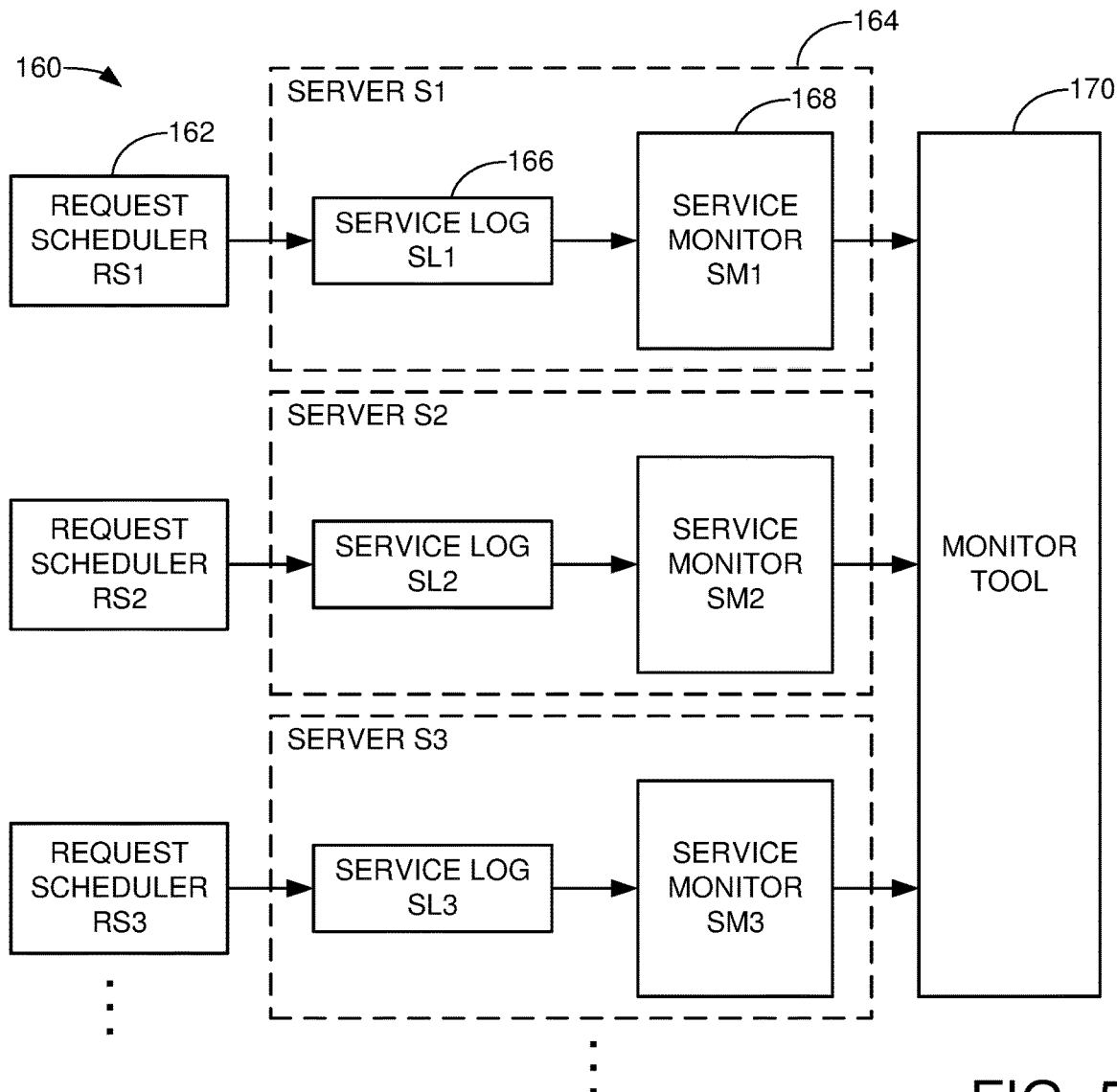
FIG. 5

SERVICE LOG ENTRY

SERVER-SIDE RESOURCE MONITORING IN A DISTRIBUTED DATA STORAGE ENVIRONMENT

SUMMARY

Various embodiments of the present disclosure are generally directed to an apparatus and method for performing real-time monitoring of resources used in a distributed data storage environment, such as but not limited to cloud computing, software container, and high performance computing (HPC) networks.

In some embodiments, a client device is configured to issue a service request to a distributed storage environment to carry out an associated service application of a server node. A request scheduler forwards the service request from the client device to a selected server node associated with the service request. A service log accumulates entries associated with data transfer operations carried out by the server node responsive to the service request over each of a succession of time periods. A service monitor accumulates, for each of the succession of time periods, information associated with the data transfer operations. A monitor tool aggregates the cumulative information to provide an indication of server-side resources utilized to satisfy the service request.

These and other features which characterize various embodiments of the present disclosure can be understood in view of the following detailed discussion and the accompanying drawings.

BRIEF DESCRIPTION OF THE DRAWINGS

FIGS. 4A and 4B provide exemplary formats for a service request and a throughput requirement issued by the system of FIG. 3 in some embodiments.

FIG. 5 shows a server-side monitoring system constructed and operated in accordance with some embodiments.

DETAILED DESCRIPTION

Figure 1:
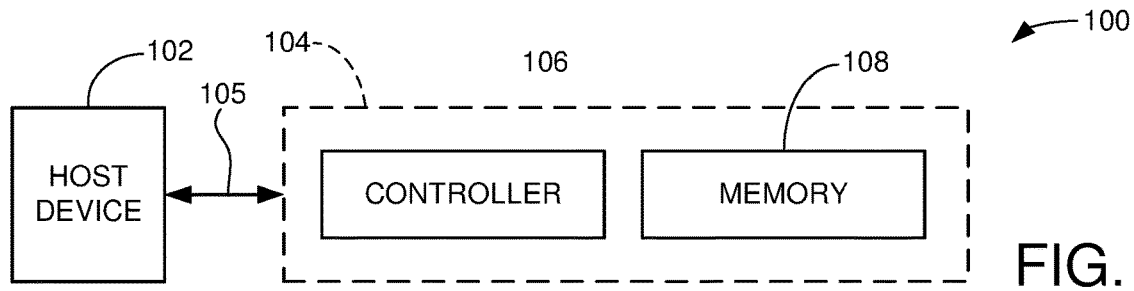
FIG. 1 is a functional block representation of a data processing system which operates in accordance with various embodiments of the present disclosure.

Data storage devices are used to store and retrieve computerized user data in a fast and efficient manner. A number of different data storage solutions have been utilized throughout the years in view of technological advancements in computer technology.

Early generation computer systems tended to use a centralized processing unit, such as a mainframe computer, which was accessed by various user data terminals via a local area network. Most data storage and processing operations were carried out at the centralized processing unit level, with little or no local storage at the terminal level.

The development of personal computers (PCs) and workstations decentralized this approach. A central server could still be used, but the data and programs used by PCs and workstations tended to be stored locally by storage devices such as hard disc drives (HDDs) and solid-state drives (SSDs) associated with the client devices. In this model, most processing and data storage operations were carried out locally by local host (client) devices.

The present availability of high throughput global networks (e.g., the Internet, cellular networks, satellite constellations, storage clusters, etc.) has shifted much of the data processing and storage capabilities away from local client devices to remote processing servers (nodes) in distributed data storage environments. Client devices can still be provisioned with local storage devices, but the bulk of data storage and processing is often carried out remotely. This trend is expected to continue into the foreseeable future.

Distributed data storage environments of the current generation tend to involve many client devices concurrently initiating the execution of applications (e.g., "jobs," "tasks," etc.) across the network by multiple processing nodes. This type of arrangement is sometimes referred to as a multi-tenant environment, where users pay or otherwise arrange to receive remotely located data processing and storage capabilities with certain guaranteed levels of performance as measured at the client level.

To manage this, request schedulers may be used to control the I/O (input/output) throughput of the system. A request scheduler may be a software or hardware based module that employs various scheduling mechanisms such as FIFO (first in, first out), FILO (first in, last out), etc. to regulate the I/O traffic in order to meet performance guarantees and ensure overall fairness among the various clients.

Throttling modules are sometimes used as part of the resource management process. A traditional throttling module operates to throttle, or limit, the maximum amount of resources utilized by a particular application to provide an upper limit, or bound, upon how many resources are being consumed by a given application. The idea behind this approach is that, by limiting the overall amount of resources (e.g., bandwidth) allocated to one application, the resources become available for use by other pending applications. While useful, this approach only indirectly benefits individual clients and does not provide a mechanism for guaranteeing that clients receive at least a minimum amount of resources for which they have contracted.

Various embodiments of the present disclosure are directed to accurately determining resource utilization on the server-side of a distributed storage environment. This can provide a number of benefits, including ensuring that minimum levels of performance are maintained for the clients of the system. As explained below, some embodiments propose a novel monitoring mechanism, on the server-side, to determine the resources (e.g., I/O throughput) required to execute and complete a particular application.

To this end, a service monitor and a service log run on each storage server involved in the execution of the selected application. A monitor module receives information on a regularly scheduled rate from each of the service monitors to provide accurate and real time analysis of the resources required by the execution of the application. These can include total aggregated bandwidth, individual component bandwidth, etc. The analysis is carried out using metrics gathered at the server-side of the system, thereby providing an accurate assessment of the resources that are actually allocated and used to execute the application.

Total read and/or write throughputs can be accumulated for each server-side resource required during the execution of the selected application, in order to arrive at an accurate assessment of the required resources. The system allows accurate monitoring of applications on multi-tenant, multi-client and multi-server environments. The monitoring can be performed at the application level, the compute node level, at the storage server node level, at the client level, etc. Multiple tasks can be monitored at the same time. Minimal log data collection requirements are envisioned, since logging only takes place for those applications selected for monitoring, and data inputs are only supplied for those actual storage servers that serve requests from the applications being monitored.

In at least some embodiments, each storage request carried out in conjunction with the selected application has a weight (such as in bytes) and can include other control information as well, such as a service identification (ID) value, a location ID value, and a distance parameter. The service ID value allows identifying an application that runs on multiple compute nodes at the storage server nodes. The location ID and distance parameters allow adjustments to the application with a particular service ID to desired total aggregated IO throughput (total bandwidth, etc.) without a central point of communication even though the requests are coming from multiple clients and routed to multiple servers. The proposed solution can be utilized in any number of distributed storage environments, including but not limited to HPC and cloud storage. The server-side monitoring displays the actual use of storage resources, and the system is application agnostic meaning that the service ID and location ID can be easily attached to each I/O request by using environment variables during deployment of applications in many operating systems. Another advantage is that the system can be used as a debugging tool in a storage QoS (quality of service) technology development environment, a tool to collect evidence on applications with SLAs (service level agreements) on minimum and/or maximum throughput guarantees, etc. An adaptive adjustment mechanism can be provided that analyzes the operation of particular applications and makes adjustments, as required, to ensure ongoing and future resource allocations are made to meet the requirements of the system.

In this way, the disclosed system provides closed loop mechanism to accurately monitor what resources are required independently of the clients involved and based on actual data collected from the storage servers that are engaged to complete the task. The proposed scheme is a server-side approach and thus bypasses client and cache storage systems to provide an actual I/O throughput rate value at the storage level.

These and other features and advantages of various embodiments can be understood beginning with a review of FIG. 1 which shows a simple data processing system 100. The data processing system 100 includes a host (client) device 102 operably coupled to a data storage device 104 via an interface 105. This is merely exemplary as any number of different types of data processing environments can be used as desired, including environments that do not involve local data storage systems.

The client device 102 may take the form of a personal computer, workstation, server, laptop, portable handheld device, smart phone, tablet, gaming console, RAID controller, cloud controller, storage enclosure controller, etc. The data storage device 104 may be a hard disc drive (HDD), solid-state drive (SSD), hybrid solid state drive (HSSD), thumb drive, optical drive, an integrated memory module, a multi-device storage enclosure, or some other form of device. The interface 105 can be a local wired or wireless connection, a network, a distributed communication system (e.g., the Internet), etc.

The data storage device 104 may be incorporated into the client device as an internal component or may be an external component accessible via a communication pathway with the client device 102 including a cabling connection, a wireless connection, a network connection, etc. For purposes of the present discussion, it will be contemplated that the host device 102 is a computer and the data storage device 104 provides a main memory store for user data generated by the host device, such as flash memory in a solid state drive (SSD). While not limiting, the memory 108 may include non-volatile memory (NVM) to provide persistent storage of data.

Figure 2:
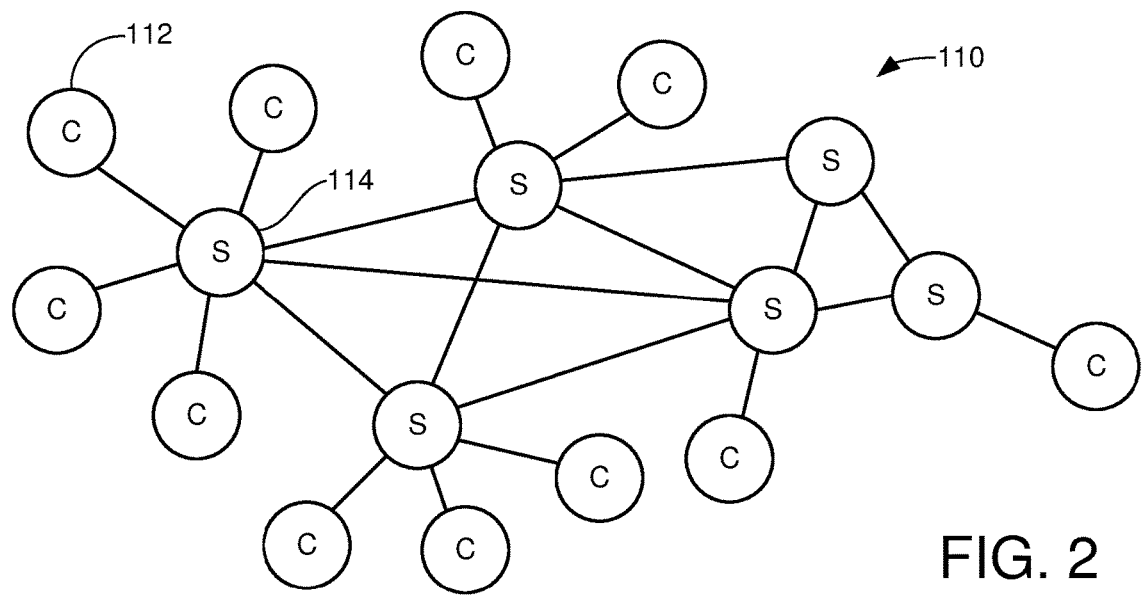
FIG. 2 shows a configuration of a computer network that may employ data processing elements of FIG. 1 in some embodiments.

FIG. 2 shows a distributed computer network 110 in a distributed data storage environment, such as but not limited to a cloud computing environment. The network 110 has a number of interconnected processing nodes including client (C) nodes 112 and server (S) nodes 114. The client nodes 112 may represent local user systems with host computers 102 and one or more storage devices 104 as depicted in FIG. 1. The server nodes 114 may interconnect groups of remotely connected clients and may include various processing and storage resources (e.g., servers, storage arrays, etc.) and likewise incorporate mechanisms such as the host device 102 and storage device 104 in FIG. 1. Other arrangements can be used. It will be understood that the monitoring processing described herein can be used to track the utilization of the server nodes 114 responsive to requests issued by the client nodes 112.

Generally, any node in the system can communicate directly or indirectly with any other node. The network 110 can be a private network, a public network, or a combination of both public and private networks. Local collections of devices can be coupled to edge computing devices that provide edge of Internet processing for larger cloud-based networks.

Figure 3:
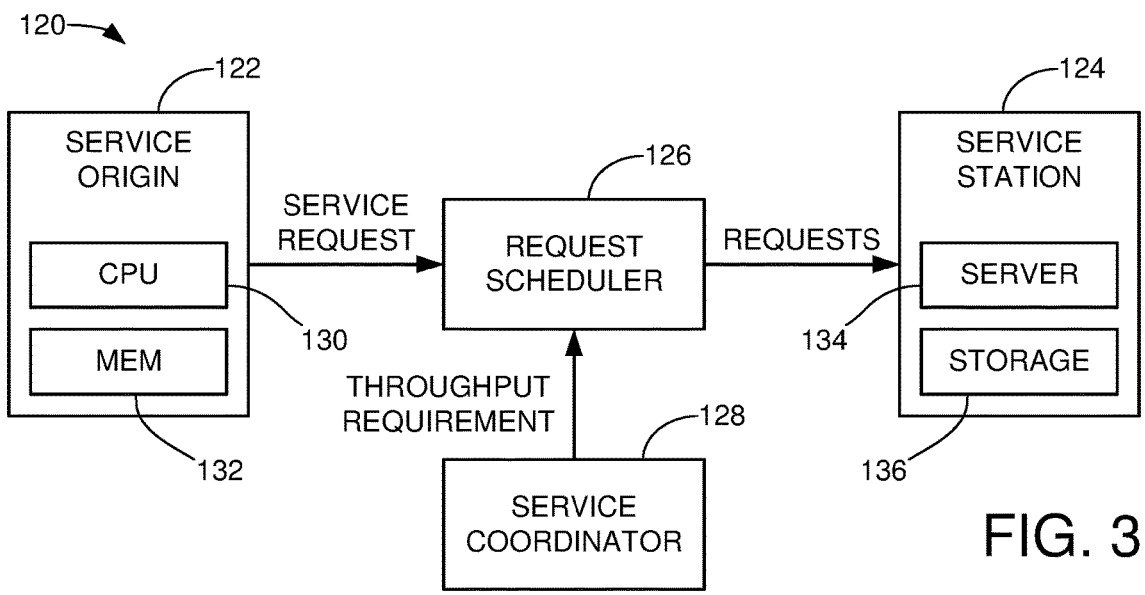
FIG. 3 is a data processing system that may form a portion of a computer network such as represented in FIG. 2.

FIG. 3 is a simplified functional diagram of a data processing system 120 that can be incorporated into a network such as the network 110 in FIG. 2. The system 120 generally includes a service origin 122, a service station 124, a request scheduler 126 and a service coordinator 128. Other configurations can be used, so the diagram is merely illustrative and is not limiting.

The service origin 122 is a device that issues a service request to initiate execution of a selected application by the service station 124. In this way, the service origin 122 can correspond to a selected client device 112 from FIG. 2, and can include various local elements including a CPU (central processing unit) 130 and local memory 132. While the following discussion may sometimes use the terms "service request" and "application" interchangeably, technically speaking, the service request (or just "request") is an overall command issued by the service origin 122, while the application (or "service") describes various operations carried out locally by the service station 124 in order to complete the request.

To this end, the service station 124 may correspond to a selected server node 114 in FIG. 2 and may include a server 134 and a storage array 136. The server 134 may have a similar configuration to the service origin 122 in that the server may include one or more programmable processors, local cache memory, etc. The storage array 136 may comprise one or more data storage devices (e.g., HDDs. SSDs, etc.) utilized to store user data, programs, databases, control data, etc. utilized by the server 134 during execution of the application. It is contemplated, although not necessarily required, that as before the storage array 136 will be characterized as including a non-volatile memory (NVM) storage space to provide persistent main storage of user data and other information.

At this point it will be noted that, while only a single service origin 122 and a single service station 124 are depicted in FIG. 3, multiple service origins and multiple service stations may be involved in the concurrent execution of one or more applications. As such, multiple service requests may be directed to the request scheduler 126 from multiple service origins 122, and these requests may in turn be forwarded to multiple service stations 124 for execution. Similarly, multiple request schedulers and/or service coordinators can be utilized, including but not limited to multiple layers of such devices, the provision of these devices for each server node, etc.

The request scheduler 126 operates as described above to manage the issuance of various requests to the various service station(s) 124. To this end, the request scheduler 126 may identify target nodes to which the requests should be directed, determine a suitable order in which the requests should be serviced, etc. The service coordinator 128 operates in conjunction with the request scheduler 126 to provide management inputs such as throughput requirements to the request scheduler 126 to ensure various performance guarantees and other limit parameters are being met.

Both the request scheduler 126 and service coordinator 128 may be realized in software or hardware. In a Lustre® file-system environment, these elements may be realized as daemons that operate in the background as a selected layer of the overall system. It will be understood that the request scheduler 126 not only directs the traffic, so to speak, of the requests being provided by the various service origins 122 to the respective service stations 124, but also manages the transfer of the generated responses, by the service stations 124, back to the various requesting service origins 122.

FIG. 4A shows an exemplary format for a service request 140 issued by a selected service origin 122 from FIG. 3 in some embodiments. Other formats can be used. The service request 140 includes a number of fields that store attributes (parameters) associated with the request (R). These attributes include a service identifier (ID) in field 142, a location ID in field 144, a request number in field 146, a weight in field 148 and a distance in field 149.

The service ID in field 142 generally represents a unique identifier value associated with the application being enacted by the selected request R. The service ID is represented as $S_x$, which as described above may be an identifier for a particular distributed service application (e.g., job, task, utility, container, etc.). The application may be distributed across a number of different locations (including across a number of different service origins, service stations, parts of a single system, distributed modules across multiple systems, etc.).

Because the service ID identifies a particular application (service), multiple service origins may issue requests R with the same service ID $S_x$. The location ID in field 144, identified as $L_y$, is used to identify the particular location (e.g., service origin, etc.) that issued the request R. For example, a selected service ID S1 may be spread across multiple locations with location IDs L1, L2 and L3. The appropriate location ID is attached to the associated service request R from each of these locations (e.g., a first request R1 would list S1/L1, a second request R2 would list S1/L2 and a third request R3 would list S1/L3).

Each request R may further be provided with a request number (n), as indicated by field 146. This represents the nth request from a particular service origin, and may be expressed as $R_n(S_x, L_y)$. While not necessarily required, it may helpful in some cases to track the requests using such request numbers, particularly in resource intensive environments involving multiple concurrent requests from multiple sources.

The weight parameter in field 148 generally corresponds to the size, or volume of data, associated with the request R. The weight is represented as $W_n(S_x, L_y)$ and determines, at least in part, how long a given service station will take in order to service the associated request (or portion thereof). Weights can be measured in a variety of ways, but are often expressed as overall bytes (e.g., 1 megabyte, MB, etc.) of data that will be processed.

The distance parameter in field 149 is another useful attribute that may be included in each service request R. As noted above, it is contemplated that multiple request schedulers will receive requests from multiple locations with different service IDs, and these respective requests may be handled in parallel. In order to provide a deadline system which, on aggregate, meets the required service throughput of the service ID $S_x$ for each location $L_y$, the associated request $R_0(S_x, L_y)$ should incorporate sufficient information to set a deadline without a priori knowledge of the processing being carried out by other service stations. In this way, each request includes self-contained information regarding the relationship of that particular request to previous requests such that a given request can be processed in the correct timeframe.

In one formulation, a sequence of incoming requests for a particular service ID S having location ID L, the distance $X_n(S_x, L_y)$ for the nth request can be calculated as follows:

$$X_n(S_x, L_y) = \Sigma_{i=0}^{n} W_i(S_x, L_y) \tag{1}$$

where $X_n$ is the distance for request n, and $W_i$ is the weight (i/O size) for request i where i is in the range of from 0 to n. In one illustrative example, consider a service ID S1 having location ID L1 and requests $R_n(S1, L1)$. In this case, distance $X_n$ is related to request n for service ID S1 at location L1. The distance $X_n$ comprises the sum of the I/O sizes of requests 0 (e.g., the first request) to request n−1 from service ID S1 at location ID L1, plus the weight $W_n$ of request $R_n$ (S1, L1) itself. For location ID L2 of service ID S1, the distance $X_n$ comprises the sum of the I/O sizes of requests 0 (e.g., the first request) to request n−1 from service ID S1 at location ID L2, plus the weight $W_n$ of request $R_n(S1, L2)$ itself. In this way, the concept of distance can be thought of as the sum of the weights (sizes) of all previous requests plus that of the current request for a given service and location sequence.

A deadline for a particular request can be utilized that is dependent upon the previous requests from a particular service ID $S_x$ and a particular location ID $L_y$, that is, the distance from the earlier requests from that service ID and location ID. This allows an aggregated minimum bandwidth to be guaranteed.

To this end, FIG. 4B shows an exemplary format for a throughput requirement (T) value 150 issued by the service coordinator 128 of FIG. 3. As before, the format in FIG. 4B is merely exemplary and not limiting. The value 150 includes a service throughput attribute in field 152. The attribute is denoted as $T(S_x)$, and generally identifies a required level of throughput that should be associated with the service ID $S_x$. It will be noted that the throughput can be measured in any number of ways, including average data rate, elapsed time, etc. A minimum rate and/or a maximum rate can be included as required. In this way, both guaranteed minimum values can be met while throttling service to ensure consistency of operation and fairness to other processes. Many modern client systems prefer consistency of I/O rates over higher variability, even if such variability includes faster I/O performance. Stated another way, it is often better to provide consistent performance with lower variability rather than higher performance with higher variability.

At this point it will be noted that the requests R issued by the so-called "client-side" devices (e.g., the service origins) to execute the associated applications can take any number of forms, but will nonetheless result in operations carried out within the distributed storage environment to provide a desired result. The requests can cover any number of suitable operations, from relatively straightforward operations (such as writing data sets to storage or reading data sets from storage) to relatively complex operations (e.g., launching a database search, performing a data analysis operation, executing a software container, etc.).

Regardless of complexity and type, however, in each case the client device will tend to issue a request (or requests) to the system, and some sort of confirmation that the request has been completed will be provided back to the client. The confirmation may be the transfer and display of specific results to the requesting client, the issuance of a command complete status to the client, and so on. In some cases, the requesting client may be part of a larger system with further upstream devices that take the results from the client and perform other, additional processing or operations.

It follows that the resources (e.g., bandwidth, etc.) required for the execution of an application associated with a particular request R can be readily observed and monitored at the client-side. For example, each client device (e.g., the client nodes 112 in FIG. 2, the service stations 122 in FIG. 3) can monitor the time at which a given request is issued, and can easily determine how long it took for the system to return the requested data or otherwise complete the requested application. Other metrics can be used, such as determining the sizes of the overall data transfers that take place both to the system from the client and that are received back from the system by the client. Ratios, average data transfer rates, reported error rates, etc., are all readily ascertainable at the client-side of the system based on information reported back to the client by the rest of the system.

Nevertheless, this type of client-side monitoring fails to indicate, on the so-called "server-side," the actual resources that were utilized in order to satisfy a given request. Stated another way, a client-side device may be able to ascertain how much time it took to complete a particular task, and may be able to observe the volume of data transferred to the system and the volume of data returned from the system, but has no information regarding what resources were utilized, on the server-side, in order to complete that task.

Accordingly. FIG. 5 provides a server-side monitoring system 160 constructed and operated in accordance with various embodiments to provide such server-side monitoring. The system 160 is contemplated as being incorporated into and operating in conjunction with the network 110 of FIG. 2 and the data processing system 120 of FIG. 3.

As shown in FIG. 5, the system 160 includes a number of request schedulers 162, similar in form and operation to the request scheduler 126 in FIG. 3. Three such request schedulers 162 are shown in FIG. 5 (denoted as RS1, RS2 and RS3), although any number can be used, including a single request scheduler or many multiples of request schedulers. In this example, each of the request schedulers is associated with a corresponding server 164 (denoted as S1, S2 and S3). As before, the servers 164 correspond to the server nodes 114 in FIG. 2 and the service stations 124 in FIG. 3, and therefore incorporate various control, processing and data storage capabilities including hardware and/or programmable processors, control memory, cache, storage arrays, etc.

Each server 164 further incorporates a service log 166 (denoted SL1, SL2 and SL3) and a service monitor 168 (denoted SM1, SM2 and SM3). A monitor tool 170 is operably coupled to these elements to perform monitoring and analysis functions as described below.

Generally, the service schedulers 162 update the service logs 166 with information associated with the various requests R being processed by the system. The service monitors 168 retrieve the information from the associated service logs 166 and forward the retrieved information to the monitor tool 170. The service logs 166, service monitors 168 and monitor tool 170 can each be realized using hardware circuits, processors, memory, and other circuitry as required. In some cases, the service logs and monitors may be background software/firmware routines executed by one or more processors at the server level (or at other levels), and the monitor tool may be a software/firmware routine executed by a designated server or at some other suitable location.

Figure 6:
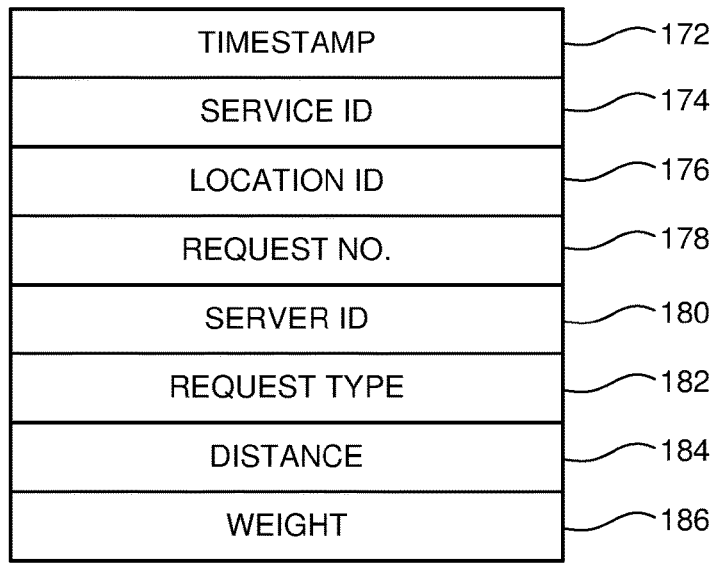
FIG. 6 provides an exemplary format for a service log entry generated and used by the system of FIG. 5 in some embodiments.

FIG. 6 provides an exemplary format for contents (entries) 170 of a selected service log 166 from FIG. 5. As before, other formats can be used. The log may be arranged as a succession of entries, so that a number of entries are maintained by the log for each combination of parameters associated with the various requests. Generally, each entry 170 may include the following parameters: a timestamp value in field 172, a service ID in field 174, a location ID in field 176, a request number in field 178, a server ID in field 180, a request type in field 182, a distance value in field 184, and a weight value in field 186.

It will be observed that several of these attributes correspond to the foregoing discussion regarding the service requests R issued by the respective service origins 122 and processed by the request schedulers 126, 162. As such, these parameters can be readily provided during the forwarding of the requests to the respective servers, and incorporated into the associated logs. These include the service ID, location ID, request No., distance, weight, etc. These parameters can thus be copied directly, or otherwise augmented/modified as required into the service log.

The service log entry 170 can be implemented using a designated memory location as part of the command processing system, can be managed as a separate file-based database, etc. Generally, it is contemplated that each entry 170 will be generated each time the server executes/services a read request (e.g., a data transfer operation to retrieve data from the server storage system such as storage 136 in FIG. 3) or a write request (e.g., a data transfer operation to program data to the server storage system). Entries 170 can be generated at other times as well. Each entry generally corresponds to an event that involved the utilization of resources, such as an access (data transfer) command involving the storage array of the server. Other forms of resource utilization events can be logged as required.

The timestamp value in field 172 will identify a particular time/date code to indicate the time at which the associated data transfer operation takes place (either or both at the beginning of the request, at the time of successful conclusion, etc.). The server ID value in field 180 provides a unique identifier to identify the associated server 164 that initiated the transfer. This can include an IP address, a WWGID (world-wide global ID), or any other unique identifier that can be used to identify the associated storage node within the system. The request type in field 182 identifies the type of data transfer (e.g., read, write, etc.). While read and write requests are of particular interest, other forms of data transfer commands and the like can be incorporated (e.g., trim commands, garbage collection commands, data relocation commands, metadata updates, etc.) in some embodiments, as desired.

As noted above, the service monitor(s) 168 can be implemented in a number of ways, including at the server level. However, in other embodiments the service monitor(s) may form a portion of the request scheduler(s) or some other suitable portion of the system. The monitor tool 170 can take any number of desired forms, including a simple command-line tool, a sophisticated API (application programming interface such as a graphical user interface, GUI), a web-based monitoring tool, etc.

Figure 7:
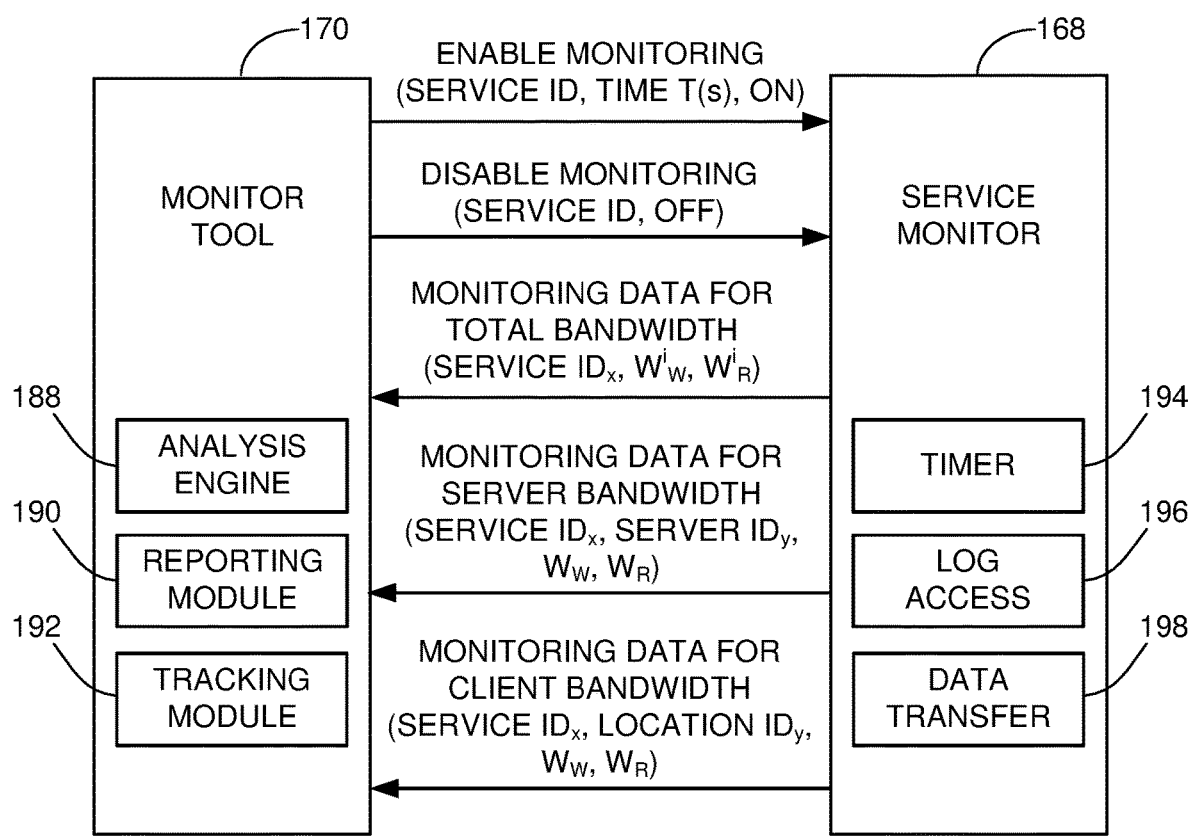
FIG. 7 illustrates various command and data exchanges that may take place between the monitor tool and the service monitor of FIG. 5 in some embodiments.

FIG. 7 depicts the monitor tool 170 in conjunction with a selected service monitor 168 from FIG. 5. A number of different data exchanges are contemplated to initiate operation, terminate operation, and determine various server-side performance metrics. To this end, the monitor tool 170 includes an analysis engine 188, a reporting module 190 and a tracking module 192.

Initially, the monitoring tool 170 operates to issue enable monitoring commands to the various service monitors 168. While this may be a tailored command to specific service monitors, it is contemplated that the enable command will be forwarded to all service monitors in the network concurrently, on the basis that it may not be initially apparent which server nodes will be involved in the processing of which requests. This also takes into account peer-to-peer level loading capabilities where server nodes can cooperate to distribute workload tasks, require information from other server nodes to complete tasks, etc. Once enabled, data analyses are carried out by the analysis engine 188 using data supplied by the respective service monitors, as explained below. At this point it will be noted that the enable monitoring command can cover all forms of monitoring, or can be specifically directed to certain types of monitoring operations to collect different granularities of performance metrics.

A suitable format for an example enable monitoring command is listed in FIG. 7, although other formats can be used. Each enable command will at least include the service ID, an applicable time interval T(s) at which data are to be reported, and an "ON" (activation indication). Other attributes can be included as well. The time interval can be any suitable quantum of time, such as every second (1 s), every two seconds (2 s), every five seconds (5 s), etc. Data will be collected as such are available, but the time interval can specify a rate at which updated data indications are forwarded for display and analysis. This can be directed by the reporting module 190.

In some cases, monitoring for a particular service ID will commence responsive to detection of the first occurrence within a given time frame of that particular service ID. It will be recalled from the foregoing discussion that the service ID is client device agnostic; it merely relates to the particular application within the system that is being activated. Monitoring will continue until disabled by the issuance of a disable monitoring command, also depicted in FIG. 7. Identifying the use of a new service ID may commence via operation of the tracking module 192.

Each disable monitoring command is issued, as before, to all of the service monitors that received the enable command. A suitable format includes the service ID, and an "OFF" indication. In some cases, tracking can be carried out by the tracking module 192 to monitor the progress of the various pending requests in the system having the associated service ID. After completion of all requests having the specified service ID, further tracking is disabled. It will be appreciated that the various service logs 166 will be updated with entries associated with the service ID while the system is enabled, and the various service logs will no longer be updated once the system is disabled. As mentioned previously, the system is enabled and disabled on a per-service ID basis, so that some service IDs may be tracked while others are not at a given time. There is no requirement that all service IDs are automatically tracked, although the system can be configured to do so as required. In some cases, internal monitoring is performed without specifically reporting to a given client device user the resulting metrics. In other cases, the tracking may be specifically arranged as a client-side option that can be initiated by a particular client device (including an activation field as part of a given service request R).

The analysis engine 188 of the monitor tool 170 can be configured to analyze a number of different performance related metrics. A first metric is sometimes referred to as a "total bandwidth" metric, which is a real-time measurement of all server-side resources utilized during servicing of the application(s) associated with the selected service ID. This total bandwidth metric thus evaluates all resources utilized by the system, including spanning all storage nodes (e.g., servers, etc.) involved in the processing of the associated request.

The associated service monitor 168 includes various modules including a timer 194, a log access mechanism 196 and a data transfer circuit 198. Generally, these operate as follows: once enabled, the service monitor uses the timer 194 and the log access module 196 to collect records from the associated service log 166 (FIG. 5) matching the selected service ID during the past T(s) interval period (e.g., timestamp value is less than the current time minus T(s)). A total read weight $W_R$ and a total write weight $W_W$ are calculated by respectively summing the weight values (e.g., field 186. FIG. 6) for these respective reads and writes (using the request type field 182. FIG. 6).

The total read weight $W_R$ represents the total amount of data read during the applicable period for the selected service ID, and the total write weight $W_W$ represents the total amount of data written during the applicable period for the selected service ID. It will be recalled that this is carried out on a per server basis, so for example, the service monitor 168 in FIG. 7 will perform these calculations for the associated server (e.g., server S1 in FIG. 5). Other service monitors will perform these respective calculations for the other servers (e.g., servers S2 and S3 in FIG. 5, etc.).

Once calculated, the weights and the associated service ID are transferred from the service monitor to the monitor tool 170. These respective calculations and transfers are carried out by the data transfer circuit 198.

In response to the data supplied by the various service monitors 168, the monitor tool 170 proceeds, via the analysis engine 188, to generate overall read throughput ($OT_R$), overall write throughput ($OT_W$) and overall total throughput ($OT_T$) values, as follows:

$$OT_R = \frac{\sum_{i=1}^{n} W_R^i}{T(s)} \quad (2)$$

$$OT_W = \frac{\sum_{i=1}^{n} W_W^i}{T(s)} \quad (3)$$

$$OT_T = \frac{\sum_{i=1}^{n} W_R^i + \sum_{i=1}^{n} W_W^i}{T(s)} \quad (4)$$

The overall read throughput $OT_R$ value indicates the total volume of data read during the associated time period to service the request. The overall write throughput $OT_W$ value indicates the total volume of data written during the associated time period to service the request. The overall total throughput $OT_T$ value indicates the total volume of data transferred during the associated time period to service the request. It will be appreciated that once these respective overall throughput values have been calculated for the associated service ID, the data values are transferred accordingly, such as for display on a display device, written to a history log/file, etc.

A second performance related metric evaluated by the monitor tool 170 is sometimes referred to as a "server level bandwidth" or "server level throughput" metric. This metric evaluates the real-time contribution of each server to a particular application. Instead of evaluating the overall impact on the system as in the discussion above, this metric evaluates the contribution by each server individually to a particular application identified by the service ID in turn. As before, an enable command can be broadcast to the associated service monitors. In some cases, this particular metric is enabled by providing a specialized enable command that includes the service ID, the associated server ID(s) being evaluated, the time interval T(s), and the ON indication. In other cases, this particular metric is automatically generated using a generic enable command as discussed above.

Once enabled, the service monitor 168 accumulates records from the associated service log 166 on a server ID and service ID basis. Data forwarded over each time interval includes the service ID, the server ID, and the previously identified total read weight $W_R$ and total write weight $W_W$ values for the associated server, as generally indicated in FIG. 7.

In response to the server level data supplied by the various service monitors 168, the monitor tool 170 proceeds, via the analysis engine 188, to generate server-level read throughput ($ST_R$), server-level write throughput ($ST_W$) and server-level total throughput ($ST_T$) values, as follows:

$$ST_R = \frac{W_R}{T(s)} \quad (5)$$

$$ST_W = \frac{W_W}{T(s)} \quad (6)$$

$$ST_T = \frac{W_R + W_W}{T(s)} \quad (7)$$

In this case, the respective values represent the total volumes of read data, write data and both processed by the associated server having the corresponding server ID for the service ID under consideration. It will be appreciated that the overall throughput values of equations (2) through (4) are obtained by summing the values from respective equations (5) through (7), so both forms of data can be obtained with little additional processing cost. As before, the resulting data values are transferred for display, storage, etc.

A third performance related metric evaluated by the monitor tool 170 is sometimes referred to as a "client level bandwidth" or "client level throughput" metric. This metric evaluates the real-time utilization of server-side resources on a per-client (location) basis. While this is similar in some ways to the client-side metrics discussed above, one difference is that this metric evaluates the actual cost in terms of resources expended by each client during the execution of the given application. This level of detail is not available at the client-side using existing client available monitoring techniques discussed above.

As before, this type of processing can be automatically enabled using a generic enable monitoring command, or via a specialized command that identifies one or more particular client devices (e.g., location ID values). Once enabled, the service monitor 168 collects records over each time interval T(s) from the associated service log 166 having the associated service ID and location ID. Values forwarded to the monitor tool 170 include the total read and total write weights WR and WW, along with other identifying information such as the service ID and location ID for the associated location (service origin).

The monitor tool 170 proceeds, via the analysis engine 188, to generate client-level read throughput ($CT_R$), client-level write throughput ($CT_W$) and client-level total throughput ($CT_T$) values, as follows:

$$CT_R = \frac{\sum_{i=1}^{n} W_R^i}{T(s)} \quad (8)$$

$$CT_W = \frac{\sum_{i=1}^{n} W_W^i}{T(s)} \quad (9)$$

$$CT_T = \frac{\sum_{i=1}^{n} W_R^i + \sum_{i=1}^{n} W_W^i}{T(s)} \quad (10)$$

In this case, the respective values represent the total volumes of read data, write data and both processed by all of the servers in the system for the associated client (location).

While the foregoing metrics provide different levels of granularity, other metrics are contemplated and will immediately occur to the skilled artisan in accordance with the present disclosure, such as evaluation on a per-client and per-server combination basis, evaluation of loading by region, type of server, type of storage, etc. Also, as mentioned above, other forms of server-side data can be collected and reported such as error rates (including bit error rates, BER), LDPC iteration counts, data relocations, garbage collection, metadata and other overhead statistics, outercode management statistics, code rate adjustments, data reconstruction occurrence rates, replication rates, and so on.

Figure 8:
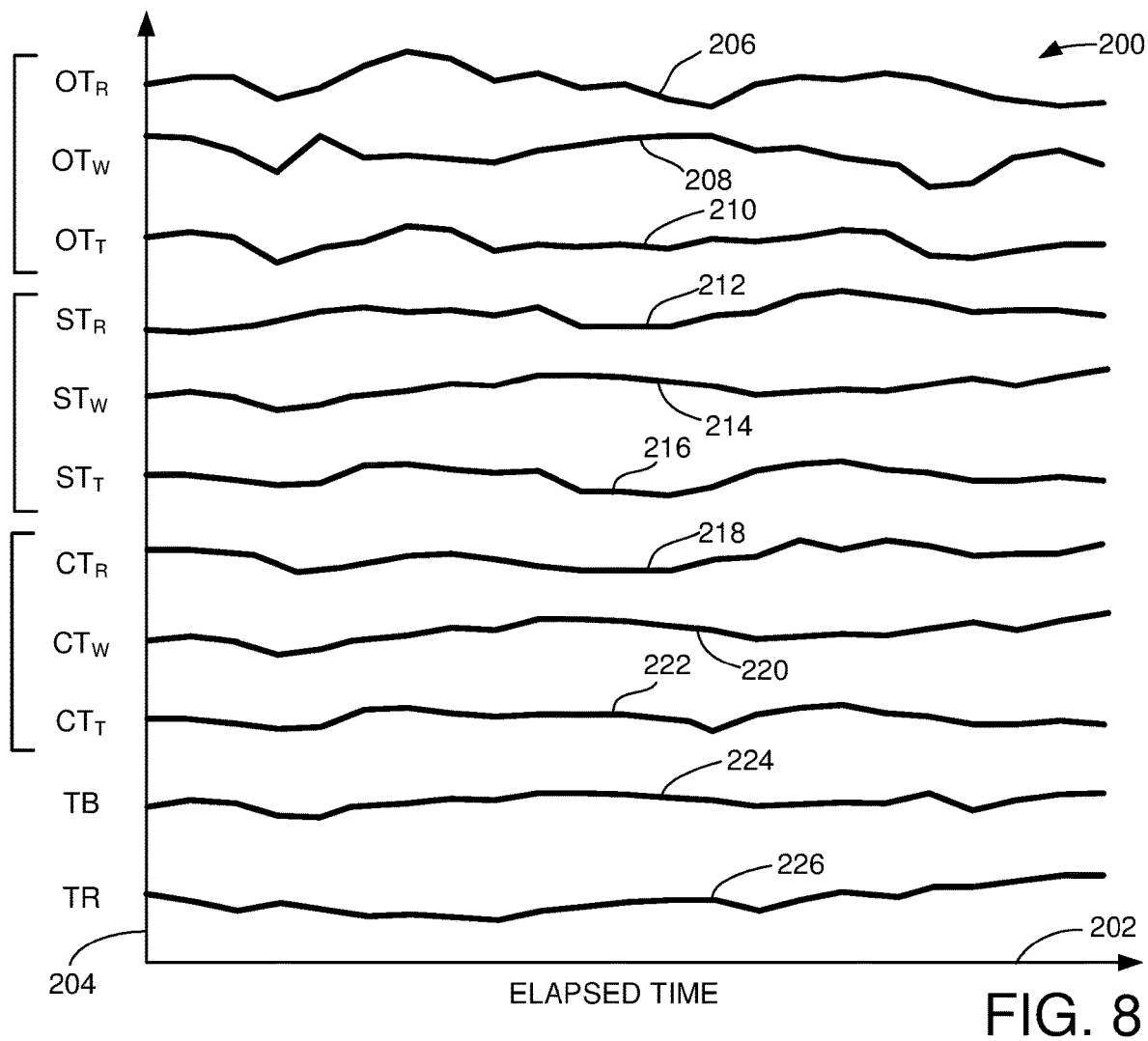
FIG. 8 shows graphical representations of data generated and displayed by the monitor tool in accordance with some embodiments.

FIG. 8 is a graphical representation of a class of data reporting curves 200 that can be generated and displayed by the monitor tool 170 in accordance with some embodiments. Other forms of data representations can be supplied, so FIG. 8 is merely for purposes of illustration and is not limiting. The curves 200 are generally representative of the types of data that can be generated and output by various embodiments, so that the particular characteristics of the curves shown in FIG. 8 will depend on a number of factors relating to actual system performance.

The various curves 200 can be displayed on a display device to indicate real-time monitoring results of the operation of the system. This information can be made available to system administrative personnel, a user, etc. The curves in FIG. 8 are plotted against an elapsed time x-axis 202 and a combined amplitude y-axis 204. Other forms and types of data displays can be utilized. The respective curves 200 are updated with a new data point at the conclusion of each time interval T(s).

The various curves 200 include a first set relating to the overall throughput values of equations (2) through (4), and include an $OT_R$ curve 206, an $OT_W$ curve 208 and an $OT_T$ curve 210. Other data (not shown) can be incorporated into the display such as threshold values to indicate guaranteed minimum and maximum throughput values, etc.

A second set of curves correspond to equations (5) through (7) and provide the server-level throughput values including an $ST_R$ curve 212, an $ST_W$ curve 214 and an $ST_T$ curve 216. As before, this can provide a real-time indication of the system resources being utilized by a selected server for the selected request.

A third set of curves correspond to equations (8) through (10) and provide the client-level throughput values including a $CT_R$ curve 218, a $CT_W$ curve 220 and a $CT_T$ curve 222.

Additional metrics can be accumulated, stored and displayed as well, such as a total bandwidth (TB) curve 224 and a total request (TR) curve 226. The TB curve 224 can provide a scaled indication of overall system utilization for all processed requests. The TR curve 226 can provide a scaled or actual indication of the total number of requests being processed at a given time by the system. It will be appreciated that any number of other metrics can be evaluated, stored and displayed as required, including in different formats. Moreover, other combinations of metrics, such as rolling averages, can be incorporated into the analysis.

Data such as shown in FIG. 8 can be made available to system administrative personnel and, as desired, clients of the system to illustrate ongoing performance thereof. In some cases, the data can be used to adjust current policies regarding the distribution of operations, adjustments to system and resource allocations, conformance to specified levels of performance, etc. The data can further be used to help system administrators plan upgrades or implement more efficient utilization of resources to optimize performance and meet existing and future needs of the clients of the system, including QoS metrics.

Figure 9:
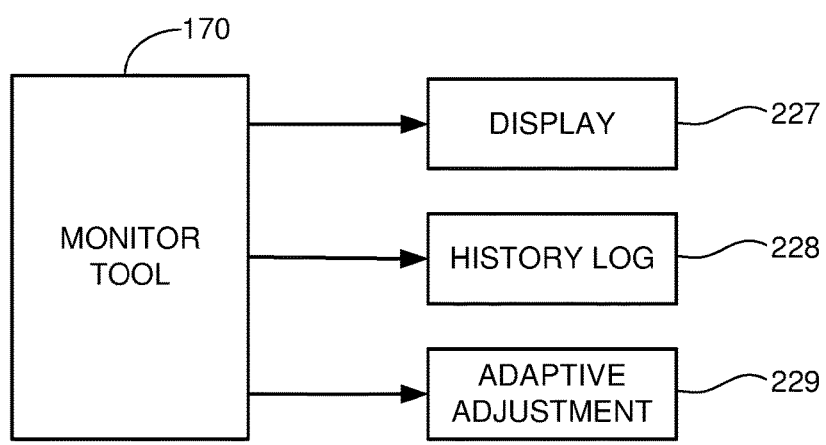
FIG. 9 shows further operation of the monitor tool in accordance with further embodiments.

FIG. 9 shows the monitor tool 170 described above in conjunction with various output devices, including a display 227, a history log 228 and an adaptive adjustment circuit 229.

The display 227 may be a computer monitor or similar device configured to output data such as discussed above in FIG. 8 to provide a human readable indication of the real-time performance of the system using the various granularities discussed herein. The history log 228 may be a computer-based memory, such as an NVM at a server or client level, that accumulates and stores the data outputs generated by the monitor tool 170 for long term storage, analysis and compliance demonstration purposes.

The adaptive adjustment circuit 229 may comprise a closed loop feedback mechanism, incorporated into hardware and/or software via one or more programmable processors, that adaptively adjusts current policies utilized by the system, including the various request schedulers, to level load or otherwise implement changes in the manner in which data sets are processed by the system in order to maintain conformance with various system requirements, performance guarantees, and other system requirements.

For example, if the execution of a particular application associated with a particular service ID is found to not meet the specified requirements for the execution of that application, the data obtained by the monitor tool 170 can be used to adjust the operation of the application, either during that execution and/or during subsequent executions. This can include adjustments made by the associated request scheduler(s), adjustments made by the service coordinator(s), the level loading of tasks, etc. In one illustrative case, a "poorly" performing application may be found to have a bottleneck within the server-side of the system, as the performance metrics indicate that one particular server node is tasked with a significant portion of the processing required to complete the application. Background operations can be carried out to distribute this load so that other, less burdened nodes take up the slack and ensure efficient processing. Other types of corrective actions can be made on-the-fly as required to ensure the system operates efficiently at all times.

Figure 10:
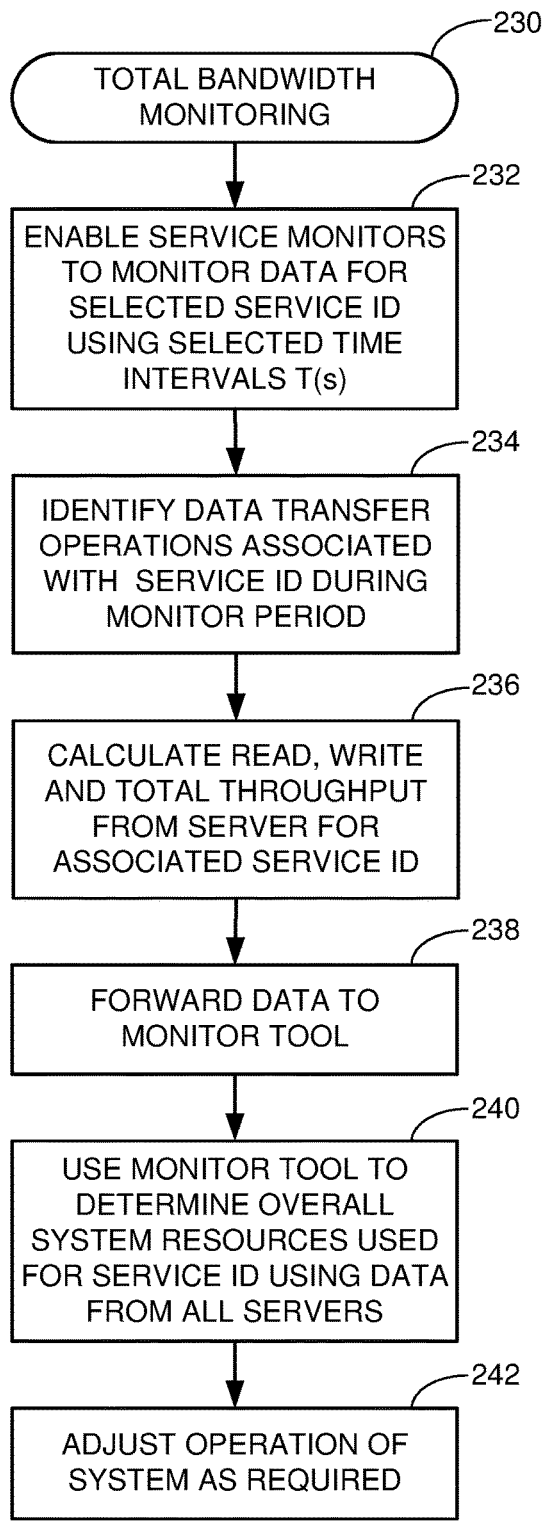
FIG. 10 is a flow chart for a total bandwidth monitoring routine.

FIG. 10 is a flow chart for a total bandwidth monitoring routine 230 in accordance with some embodiments. The flow chart illustrates general steps that may be carried out in accordance with the foregoing discussion to ascertain, on a real-time basis, system performance with regard to the overall system resources (e.g., total bandwidth) required to service requests associated with a particular service ID. It will be appreciated that the flow of FIG. 10 is merely illustrative and that other steps can be added, the various illustrated steps can be modified, appended, etc.

Step 232 shows an initial enablement operation in which an enable monitoring command is issued by the monitor circuit 170 to initiate the monitoring of data at a selected time interval granularity T(s). The monitoring is for requests associated with a selected service ID in the manner previously discussed. As noted above, the monitoring will continue until such time that the monitoring is disabled.

At step 234, selected transfer operations at the server level with a storage system, such as a storage array, are identified such as via a service log adapted as discussed above. The particular transfer operations under consideration include writes to the storage system and reads from the storage system. As discussed above, these are logged by the various service logs with appropriate timestamp and other information. Other transfer operations can be utilized, however, including background operations necessary to support the ongoing support of the client based operations.

At step 236, weights are calculated by the service monitors for the associated data transfer operations (e.g., reads and writes and total throughput, although other values can be calculated as well). These values are forwarded at step 238 to the monitor tool, which uses these values at step 240 to determine overall system resource values (e.g., $OT_R$, $OT_W$, $OT_T$, etc.). These values represent, as discussed above, the overall system resources utilized over each time interval to service the associated applications identified by the corresponding service IDs in the issued service requests R. At step 242, corrective actions are taken as required to adaptively adjust system parameters to ensure optimum performance is obtained.

Figure 11:
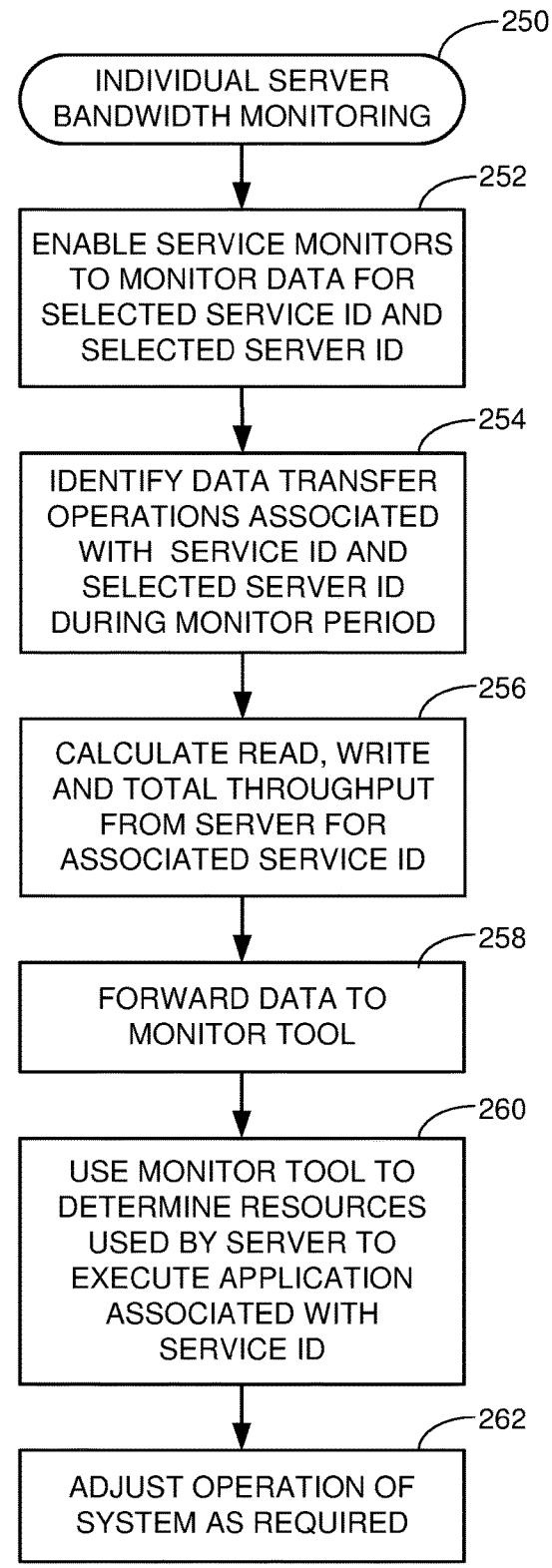
FIG. 11 is a flow chart for an individual server bandwidth monitoring routine.

FIG. 11 is another flow chart to depict an individual server bandwidth monitoring routine 250. This routine can be carried out as described above to assess the individual operation of the separate servers in servicing the various applications identified by the service requests R. Different routines can be utilized as required.

At step 252, the service monitors are enabled via one or more enable monitoring commands issued by the monitor tool 110. In this case, specific information can be supplied including the identification of the service ID and the server ID(s) for the server(s) to be monitored.

Step 254 shows the operation of the respective service monitors 168 in identifying data transfer operations with associated server storage systems. These can be limited to specific read and write operations, or can cover other types of operations as required.

At step 256, at least read and write weights are calculated by the associated service monitors 168. These and other data values are transferred at step 258 to the monitor tool 170, which operates at step 260 to calculate overall server-based resources required, on an individual server level, to service the associated ID. These can include read, write and throughput values $ST_R$, $ST_W$ and $ST_T$ as discussed above. As before, these values can be used at step 262 to initiate adjustments to the system to ensure efficient operation is maintained.

Figure 12:
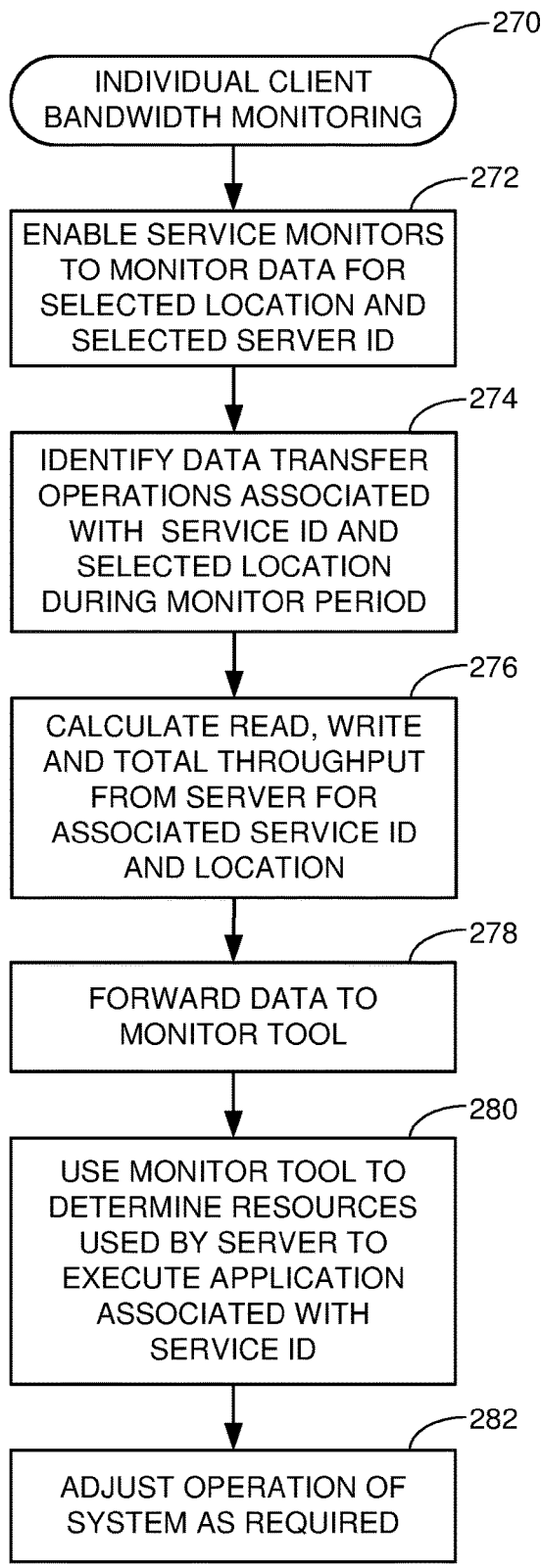
FIG. 12 is a flow chart for an individual client bandwidth monitoring routine.

FIG. 12 provides a flow chart for an individual client bandwidth monitoring routine 270 in accordance with the foregoing discussion. The routine 270 of FIG. 12 can be modified as before. Step 272 provides an enablement operation in which the client-based performance metric is measured and analyzed. This can include issuance of an enable monitoring command that includes location ID information to identify the client or client devices to be monitored.

As before, step 274 provides, for each time interval, the identification of associated data transfer commands associated with the corresponding client (location) and service ID. Read, write and total throughput values are determined at step 276, and these are forwarded at step 278 to the monitor tool 170 for calculation of client-based resource utilization values $CT_R$, $CT_W$ and $CT_T$, step 280. Corrective actions can thereafter be taken at step 282 as needed.

Figure 13:
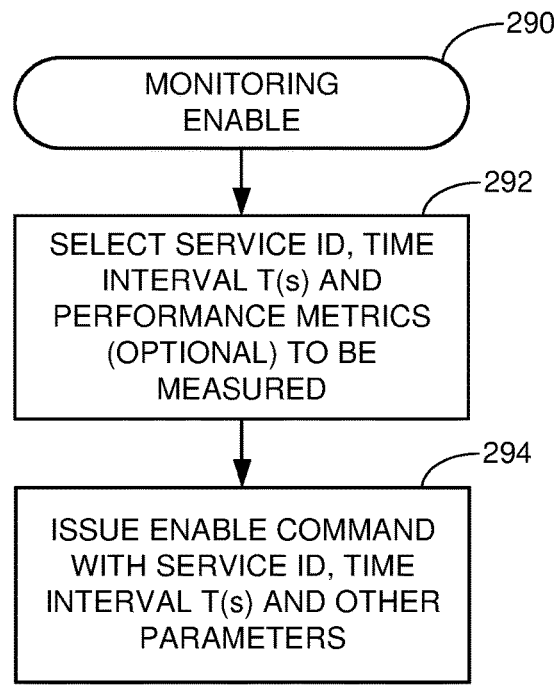
FIG. 13 is a flow chart for a monitoring enable routine.

FIG. 13 provides a flow chart for a monitoring enable routine 290. This routine is used as required to initiate monitoring functions as described above. Step 292 includes the identification of the associated service ID to be monitored, as well as the associated time interval T(s) at which real-time monitoring is to occur. As desired, various other performance metrics to be measured can be selected as well, so that the enable command can include these as well (e.g., server ID, location ID, etc.). The format of the enable command will determine which performance metrics are collected and reported.

At step 294, an enable monitoring command is issued corresponding to the selections made in step 292. The command is broadcast to all service monitors in the system, or to selected system monitors as required. Thereafter, as discussed above, the various monitoring functions of the monitor tool 170, including those described in FIGS. 10-12, will be carried out.

Figure 14:
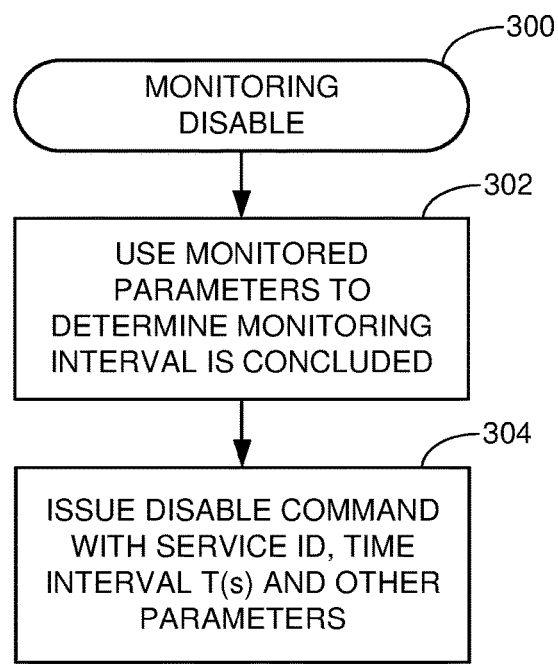
FIG. 14 is a flow chart for a monitoring disable routine.

FIG. 14 provides a flow chart for a monitoring disable routine 300. This routine is carried out as described above to disable further monitoring for the associated service IDs. Step 302 shows a monitoring function that detects that all further monitoring is to be concluded. This can include the completion of all outstanding requests R having the associated service ID. This can be based on other factors, however, such as an elapsed time period during which no further commands have been issued having the associated service ID. In further cases, an external command, such as from an authorized party (e.g., a selected client user, a selected administrative personnel, etc.) can be used to command disablement of the monitoring operation. As noted above, different types of performance metrics can be monitored concurrently or at different times, as required.

Regardless of source, once the monitoring interval has been concluded, a disable command is issued at step 304 to cease further monitoring. It is contemplated that the disable monitoring command may be on a service ID basis and may include other parameters as well.

Figure 15:
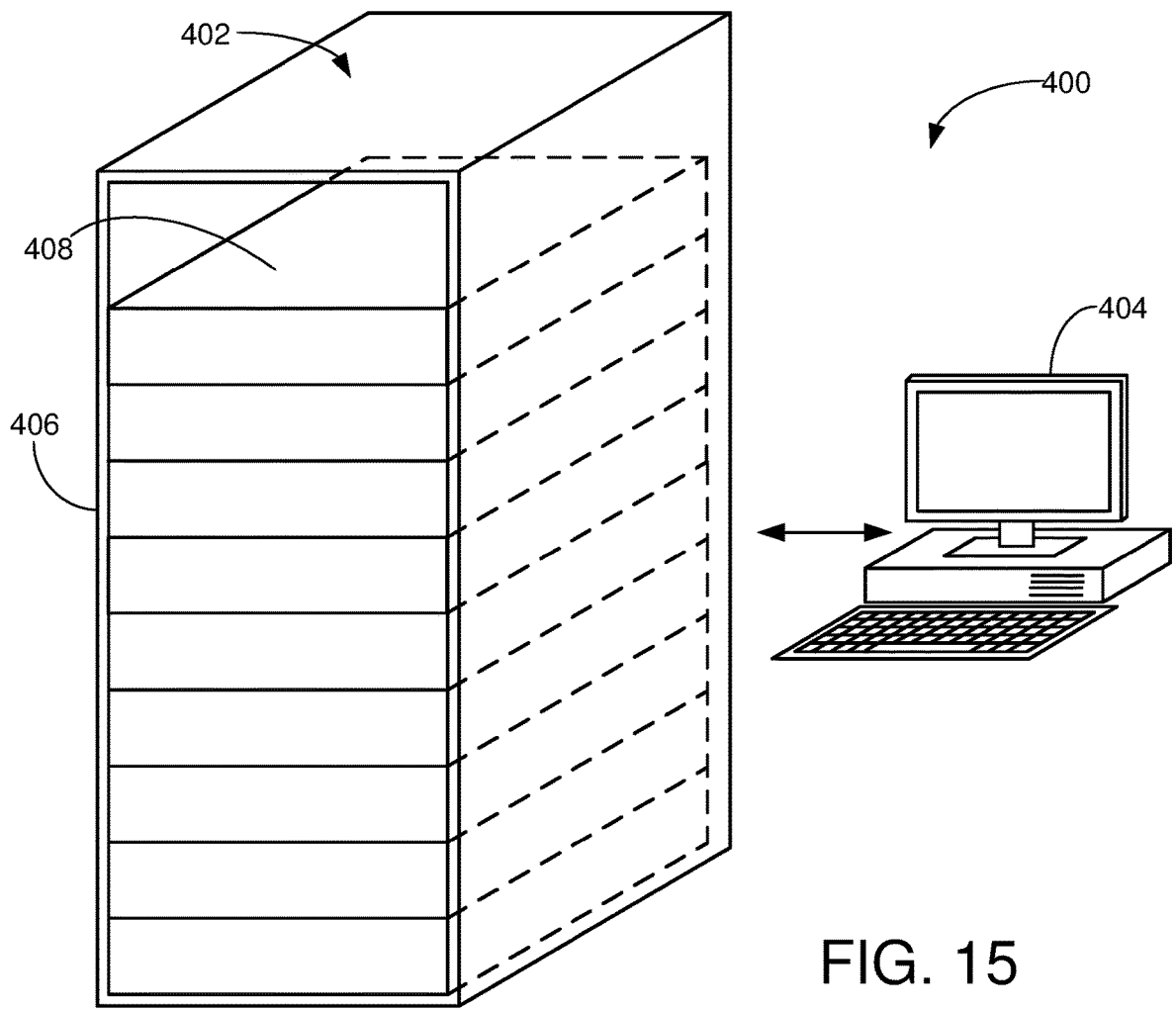
FIG. 15 represents a server node of the system in accordance with further embodiments.

FIG. 15 shows a schematic depiction of a data storage system 400 in which various embodiments of the present disclosure may be advantageously practiced. It will be appreciated that the system 400 can correspond to each of the storage nodes 114, service stations 124 and/or servers 164 discussed above.

The data storage system 400 is a mass-data storage system in which a large population of data storage devices such as 104 (FIG. 1) are incorporated into a larger data storage space to provide a storage node as part of a larger geographically distributed network. Examples include a cloud computing environment, a network attached storage (NAS) application, a RAID (redundant array of independent discs) a storage server, a data cluster, an HPC environment, etc.

The system 400 includes a storage assembly 402 and a computer 404 (e.g., server controller, etc.). The storage assembly 402 may include one or more server cabinets (racks) 406 with a plurality of modular storage enclosures 408. While not limiting, the storage rack 406 is a 42 U server cabinet with 42 units (U) of storage, with each unit extending about 1.75 inches (in) of height. The width and length dimensions of the cabinet can vary but common values may be on the order of about 24 in.×36 in. Each storage enclosure 408 can have a height that is a multiple of the storage units, such as 2 U (3.5 in.), 3 U (5.25 in.), etc. to accommodate a desired number of adjacent storage devices 134. While shown as a separate module, the computer 404 can also be incorporated into the rack 406.

Figure 16:
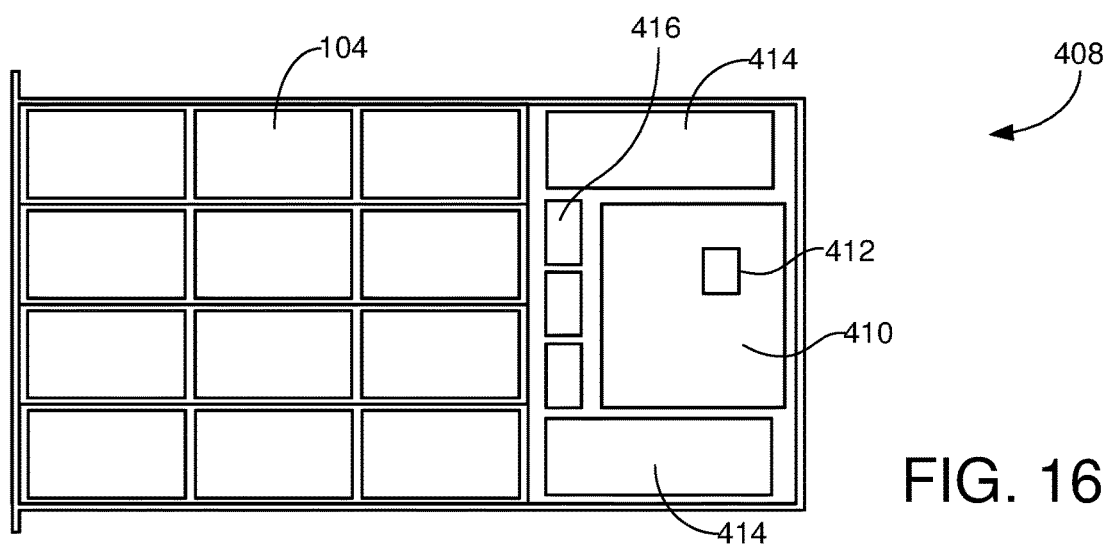
FIG. 16 shows a storage enclosure from FIG. 15 in some embodiments.

FIG. 16 is a top plan view of a selected storage enclosure 408 that incorporates 36 (3×4×3) data storage devices 104. Other numbers and arrangements of data storage devices can be incorporated into each enclosure, including different types of devices (e.g., HDDs, SDDs, etc.). The storage enclosure 408 includes a number of active elements to support the operation of the various storage devices, such as a controller circuit board 410 with one or more processors 412, power supplies 414 and cooling fans 416.

The modular nature of the various storage enclosures 408 permits removal and installation of each storage enclosure into the storage rack 406 including under conditions where the storage devices 104 in the remaining storage enclosures within the rack are maintained in an operational condition. In some cases, the storage enclosures 408 may be configured with access panels or other features along the outwardly facing surfaces to permit individual storage devices, or groups of devices, to be removed and replaced. Sliding trays, removable carriers and other mechanisms can be utilized to allow authorized agents to access the interior of the storage enclosures as required.

Figure 17:
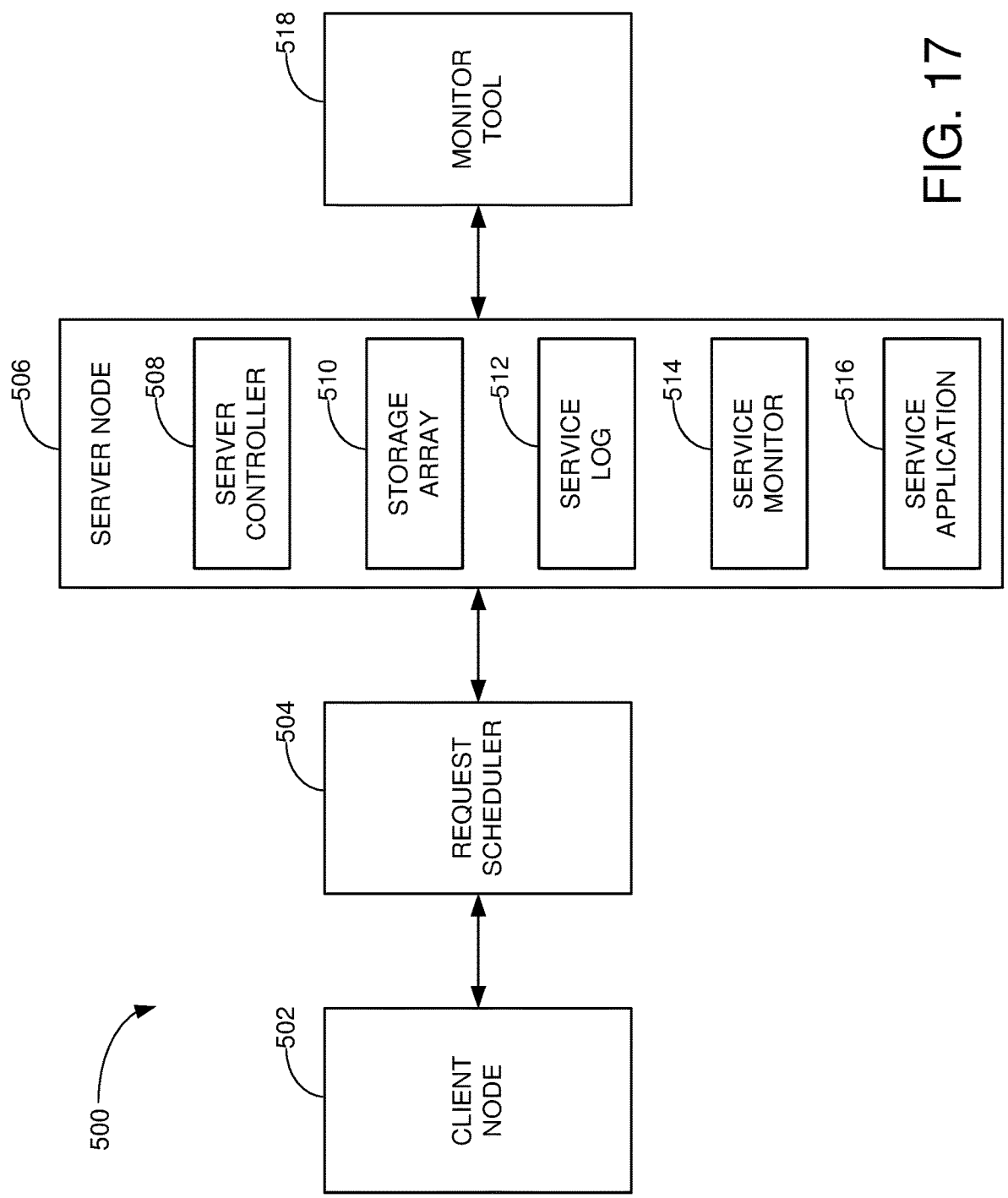
FIG. 17 is a functional block representation of a data processing system constructed and operated in accordance with various embodiments.

FIG. 17 provides another functional diagram for a data processing system 500 constructed and operated in accordance with various embodiments. The system 500 in FIG. 17 can be readily incorporated into the various systems and networks discussed above.

The system 500 includes a client node 502, which as described above can operate as a user device to initiate a request R to carry out an application in a distributed storage environment of which the system 500 forms a part. The request R is forwarded to a request scheduler 502, which operates as described above to manage the request, as well as additional requests, supplied to the system.

A server node 506 represents an application aspect of the overall distributed storage environment, and can include various elements including a server controller 508, a storage array 510, a service log 512, a service monitor 514, and a service application 516. These respective elements can operate as described above to perform operations responsive to the various requests issued to the system as well as to accumulate and process performance metrics associated therewith.

The service application 516 can represent data and programming instructions stored in the storage array 510, or elsewhere, that are operated upon as a result of a service request issued by the client node 502 and forwarded to the server node 506 by the request scheduler 504. Finally, FIG. 17 further shows a monitor tool 518 which operates as described above to process data obtained during the server-side monitoring operations, including directing adaptive adjustments to the system to enhance performance.

It follows that the various metrics obtained by various embodiments can be measured at various levels, including at the overall storage node, at the storage enclosure level, at the individual storage device level, on a per-client utilization level, and so on. Substantially any level of information on the server-side can be generated and provided in an efficient manner to track the flow of data through the system, thereby enabling real-time monitoring, analysis and adjustment of the resources required to carry out various requests issued on the client-side of the system.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. An apparatus comprising:
   a request scheduler which forwards a service request received from a client node to a server node in a distributed storage environment to initiate execution of an associated service application;
   a service log which accumulates entries associated with data transfer operations carried out by the server node during the execution of the associated service application responsive to the service request, each data transfer operation comprising a read/write operation between a server node controller and a server node data storage device associated with the server node controller, each entry in the service log capturing server-side information associated with a different one of the data transfer operations, the captured server-side information in each entry identifying server-side resources used by the server node to service the associated data transfer operation including at least a timestamp value for the associated data transfer operation, a server identification (ID) value that identifies a server device associated with the server node that processed the data transfer operation, a request type value that identifies the associated data transfer operation as a read or write operation, and a volume of data transferred between the server node controller and the server node data storage device during the servicing of the data transfer operation;
   a service monitor circuit which, for each of a succession of time periods during the execution of the associated service application, accumulates at least portions of the captured server-side information from the entries in the service log to provide cumulative server-side information associated with the data transfer operations, the service monitor storing the cumulative server-side information in a memory;
   a monitor tool circuit which aggregates the cumulative server-side information to provide an indication of server-side resources utilized to satisfy the service request, the indication of server-side resources comprising a total amount of data transferred by the data transfer operations between the server node controller and the server node data storage device resulting from the execution of the associated service application responsive to the service request, the total amount of data transferred between the server node controller and the server node data storage device being different from an amount of data transferred between the client node and the server node as a result of the service request, the monitor tool storing the indication of server-side resources in the memory; and
   an adaptive adjustment circuit configured to adjust at least one server-side parameter associated with the server node to adjust a loading level of the server node responsive to the indication of server-side resources.

2. The apparatus of claim 1, wherein the server node is a first server node, wherein at least a second server node is also involved in the execution of the associated service application responsive to the service request, the service log further generates corresponding entries associated with read/write data transfer operations carried out between a second server node controller and a second server node data storage device of the second server node during execution of the associated service application responsive to the service request, and the indication of server-side resources utilized to satisfy the service request is broken out on a per-server node basis to comprise a first subtotal amount of data transferred using the first server node and a second subtotal amount of data transferred using the second server node.

3. The apparatus of claim 1, wherein the service request is a first service request, the server node further concurrently receives and processes a second service request during the processing of the first service request, the service log further accumulates entries corresponding to read/write data transfer operations carried out between the server node controller and the server node data storage device of the server node during execution of the second service application responsive to the second service request, and the service monitor circuit and the monitor tool circuit operate responsive to the second entries to provide an indication of server-side resources utilized by the server node as a combined total amount of data processed by the server node in satisfying both the first and second service requests.

4. The apparatus of claim 1, wherein the server node is a first server node, the service request is a first request, the request scheduler concurrently forwards a second request from the client node to a second server node, the service log further generates corresponding entries associated with read/write data transfer operations carried out between a second server node controller and a second server node data storage device of the second server node during execution of the second service application responsive to the second service request, and the indication of server-side resources further is further broken out on a per-client basis so as to comprise an indication of a total amount of data transferred internally by the first and second server nodes for the client node.

5. The apparatus of claim 1, wherein the server node data storage device comprises a non-volatile memory (NVM) storage array associated with the server node.

6. The apparatus of claim 1, wherein the indication of the server-side resources utilized to satisfy the service request further comprises at least one of an error rate, an LDPC iteration count, a data relocation indication, a garbage collection indication, or a code rate adjustment indication associated with the server side data storage device.

7. The apparatus of claim 1, wherein the service request comprises a service identification (ID) value that uniquely identifies the service application to be executed in response to the issuance of the service request.

8. The apparatus of claim 7, wherein the service request issued by the client node further includes a location ID value associated with the client node.

9. The apparatus of claim 1, wherein the service log comprises a plurality of entries, each entry comprising a service ID value indicative of the service application, and a weight value, each entry in the service log added by the controller of the server node responsive to a data transfer operation that is carried out to transfer data to or from a storage array of the storage node responsive to the service request.

10. The apparatus of claim 9, wherein the service monitor circuit accumulates, over each of the succession of time periods, associated entries from the service log associated with the service request and forwards data extracted from the associated entries to the monitor tool circuit at an interval corresponding to the succession of time periods.

11. The apparatus of claim 1, wherein the server node comprises the service log, the service monitor circuit, a server processor corresponding to the server node controller and a server storage array corresponding to the server node data storage device, the service log, the service monitor circuit, the server processor and the server storage array housed within a rectangular rigid enclosure.

12. The apparatus of claim 11, wherein the server storage array comprises a plurality of data storage devices comprising a plurality of at least one hard disc drive (HDD) or a plurality of at least one solid-state drive (SSD).

13. The apparatus of claim 1, further comprising a service coordinator coupled to the request scheduler, the service coordinator assigning a throughput service requirement value to the service request indicative of a minimum performance metric and a maximum performance metric expressed at least in terms of a minimum and maximum amount of data to be transferred over a selected period of time between the client node and the server node, the adaptive adjustment circuit configured to adjust the operation of the server node responsive to the throughput service requirement value.

14. The apparatus of claim 1, wherein the data transfer operations comprise write operations to write data to the server node data storage device of the server node associated with execution of the associated service application, and read operations to read data from the server node data storage device of the server node associated with execution of the associated service application.

15. A method comprising:
  issuing, by a client node in a distributed storage environment, a service request to enact an application;
  forwarding, by a request scheduler, the service request to a server node;
  executing the application by a server controller of the server node;
  storing, in a service log by the server controller, a separate entry for each data transfer operation carried out by the server controller to transfer data to or from a server storage array of the server node resulting from the execution of the application, each entry in the service log identifying server-side resources used by the server node to service the associated data transfer operation including at least a timestamp value for the associated data transfer operation, a server identification (ID) value that identifies a server device associated with the server node that processed the data transfer operation, a request type value that identifies the associated data transfer operation as a read or write operation, and a volume of data transferred between the server controller and the server storage array the server node during the servicing of the data transfer operation;
  accumulating, by a service monitor circuit of the server node, data throughput information from the service log over each of a succession of time intervals indicative of amounts of data transferred between the server controller and the server storage array of the server node during the execution of the application for the associated time interval;
  reporting, by a monitor tool circuit, performance metrics of the distributed storage environment responsive to the execution of the application identified by the service request, the performance metrics identifying a total volume of data transferred between the server controller and the server storage array for each of the succession of time intervals in turn, the total volume of data different than a volume of data that is transferred between the client node and the server node associated with the service request; and
  throttling a rate at which the server node continues execution of the application responsive to the performance metrics from the monitor tool to maintain a predetermined service throughput requirement for the client node.

16. The method of claim 15, wherein the monitor tool circuit provides a performance metric that indicates the overall total throughput of the distributed storage environment by all associated server nodes involved in execution of the service request.

17. The method of claim 15, wherein the monitor tool circuit provides a performance metric that indicates the overall total throughput of the selected server node during execution of the service request, wherein at least one additional server node in the distributed storage environment contributes to said execution.

18. The method of claim 15, wherein the monitor tool circuit provides a performance metric that indicates the total throughput of the distributed storage environment associated with the client node during execution of the service request, wherein at least one additional client node in the distributed storage environment contributes to said execution.

19. The method of claim 15, wherein the performance metrics reported by the monitor tool circuit further comprise at least one of an error rate, an LDPC iteration count, a data relocation indication, a garbage collection indication, or a code rate adjustment indication associated with the server storage array during the data transfer operations with the server controller.

20. The method of claim 15, wherein the time intervals in the succession of time intervals are each at least one second in duration so that an updated set of values for the performance metrics reported by the monitor tool circuit are provided at the conclusion of each time interval.

* * * * *